US007696705B2

(12) United States Patent
Stork

(10) Patent No.: US 7,696,705 B2
(45) Date of Patent: Apr. 13, 2010

(54) METHOD FOR MEASURING THE ROTATIONAL SPEED OF AN EC MOTOR

(75) Inventor: Holger Stork, Buehl (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 1233 days.

(21) Appl. No.: 11/116,757

(22) Filed: Apr. 28, 2005

(65) Prior Publication Data

US 2005/0253541 A1 Nov. 17, 2005

(30) Foreign Application Priority Data

May 15, 2004 (DE) .................... 10 2004 024 307

(51) Int. Cl.
*H02P 25/08* (2006.01)
(52) U.S. Cl. ............... 318/254.1; 318/244; 318/738
(58) Field of Classification Search ............ 318/254.1, 318/244, 738
See application file for complete search history.

(56) References Cited

U.S. PATENT DOCUMENTS

| 5,377,535 | A | * | 1/1995 | Angermaier et al. ...... 73/114.26 |
| 5,511,042 | A | | 4/1996 | O'Brien, Jr. ............... 367/135 |
| 5,659,438 | A | * | 8/1997 | Sasamoto et al. ........ 360/78.09 |
| 5,796,228 | A | | 8/1998 | Kojima et al. ............. 318/605 |
| 6,559,616 | B2 | * | 5/2003 | Aoki et al. ............... 318/567 |
| 6,891,346 | B2 | * | 5/2005 | Simmons et al. ........ 318/400.04 |
| 2004/0061461 | A1 | | 4/2004 | Tajima et al. ............. 318/254 |
| 2004/0128106 | A1 | | 7/2004 | Rauer et al. .............. 702/151 |
| 2004/0231947 | A1 | | 11/2004 | Baehr ..................... 192/84.2 |
| 2005/0067996 | A1 | * | 3/2005 | Eba ....................... 318/609 |
| 2005/0093498 | A1 | | 5/2005 | Hill ....................... 318/439 |

FOREIGN PATENT DOCUMENTS

| DE | 198 12 966 | 9/1999 |
| DE | 102 32 500 | 7/2003 |
| DE | 102 53 388 | 6/2004 |
| DE | 10 2004 050 999 | 6/2005 |
| FR | 2 860 359 | 4/2005 |

* cited by examiner

*Primary Examiner*—Walter Benson
*Assistant Examiner*—Erick Glass
(74) *Attorney, Agent, or Firm*—Davidson, Davidson & Kappel, LLC

(57) ABSTRACT

A method for measuring the rotational speed of an EC motor having a primary part including a winding, and a secondary part having magnet segments offset with respect to one another in the circumferential direction and magnetized in alternatingly opposite directions, the magnet segments having tolerances regarding their positioning and/or their dimensions, the method including rotating the secondary part with respect to the primary part and detecting the position of the magnet segments with respect to the primary part. The position measuring signal is differentiated to form a rotational speed signal. At least one correction value is determined and saved to compensate the influence of at least one of the tolerances on the speed signal. The speed signal is corrected with the aid of the correction value.

16 Claims, 4 Drawing Sheets

METHOD FOR MEASURING THE ROTATIONAL SPEED OF AN EC MOTOR

Priority is claimed to German Patent Application No. DE 10 2004 024 307.7, filed on May 15, 2004, the entire disclosure of which is incorporated by reference herein.

The present invention relates to a method for measuring the rotational speed of an EC motor, the EC motor having a primary part including a winding and a secondary part including magnet segments circumferentially offset with respect to one another and magnetized in alternating directions with respect to one another, the magnet segments having tolerances regarding their positioning and/or their dimensions, the secondary part being rotated with respect to the primary part, and the position of the magnet segments relative to the primary part being detected, and the position measuring signal being differentiated to form a rotational speed signal.

BACKGROUND

A method for measuring the speed of an EC motor, which is provided for operating a hydraulic pressure medium transmitter, is described in DE 102 32 500 A1, where the pressure medium transmitter adjusts a clutch, via which a torque is transmissible from the internal combustion engine to the transmission of a motor vehicle. While the secondary part of the EC motor is moved with respect to the primary part by commutating the current supply to the winding, the position of the magnet segments of the secondary part with respect to the primary part is detected using Hall sensors. The position measuring signal changes its value after each segment, i.e., rotational angle, of 6°. The position measuring signal is differentiated to form the rotational speed signal. To improve the resolution of the speed signal over the periphery of the EC motor, the segment between two sensor signals is subdivided into a number of substeps. The system is synchronized at the position of a sensor signal in such a way that the instantaneous rotational speed is known. The rotational speed from substep to substep is computed starting from this point using the model until synchronization is performed again at the next sensor signal. The resolution of the rotational speed signal over the periphery can be improved using this method.

However, since the magnet segments have tolerances regarding their positioning on the periphery of the secondary part and regarding their dimensions in the circumferential direction, which are not individually known in detail, inaccuracies which are not, or at least not fully, compensated even by subdividing the segment between two sensor signals into substeps occur when the model is synchronized. If the angular position between two magnet segment-sensor combinations in the case of an EC motor having four pairs of poles and three Hall sensors, for example, differs from a setpoint value by ±20% and the speed of the EC motor is 1000 rpm, the position measuring signal changes value every 2.5 ms on the average, i.e., from 2 ms to 3 ms. The speed thus varies from 833 rpm to 1250 rpm, i.e., it may differ from the previous value by approximately 40%. These sudden changes in the measured speed, exhibiting differences of ±20% from the actual speed, considerably affect a speed governor, for example, or only allow low-dynamics regulation.

While the speed signal could be smoothed, for example, by forming the mean of the next-to-last, last, and present measured speed values, the averaged measured speed value would not reflect the speed at the present point in time, but at the time of the last change in the position measuring signal.

SUMMARY OF THE INVENTION

An object of the present invention is to provide a method for measuring the rotational speed of an EC motor that renders possible precise determination of the rotational speed of the EC motor in a simple manner.

The present invention provides a method for measuring the rotational speed of an EC motor that includes determining and storing at least one correction value for compensating the effect of at least one of the tolerances on the speed signal, and correcting the speed signal with the aid of the correction value.

When a magnet segment of the secondary part subject to tolerances passes a magnet sensor situated in a fixed position with respect to the primary part, the position measuring signal for the corresponding magnet segment, detected by the magnet sensor, always has the same error caused by the tolerance of the magnet segment when passing the magnet sensor. This error is determined by a measurement operation or in another manner to then determine a correction value, via which the speed signal is corrected at a later point in time when the respective magnet segment passes the magnetic field sensor again. A measurement inaccuracy in the speed signal caused by a tolerance of a magnet segment may thus be corrected in a simple manner. It is even possible to perform this correction of the currently measured speed value on-line without a time delay occurring between the corrected speed value and the uncorrected speed value.

German Patent Application 103 55 566.8 describes a method unlike the one named in the preamble for operating an EC motor, in which correction values for a position measuring signal are determined. Using the corrected position measuring signal, commutation points in time are determined at which the current supplied to the EC motor winding is commutated. To determine the correction values, the secondary part is moved relative to the primary part when the winding is de-energized, an induction voltage measuring signal for the electrical voltages induced by the magnet segments in the winding being measured during the relative motion. In addition, the position measuring signal is measured using a position measuring device, which is oriented with respect to the magnetic field of the magnet segments. By comparing the position measuring signal with the induction voltage measuring signal which is used as a reference signal, the correction values for the position measuring signal are determined. However, German Patent Application 103 55 566.8 does not disclose a method for measuring the rotational speed of the EC motor.

In an advantageous embodiment of the present invention, the position of the magnet segments is detected using a measuring device which has a plurality of magnetic field sensors on the primary part, which are situated on the periphery of the primary part offset relative to one another in such a way that a number of magnet segment-sensor combinations are run through with each revolution of the secondary part relative to the primary part, a correction value being determined, saved, and used for correcting the speed signal for each of these magnet segment-sensor combinations. The corrected speed signal then has an even higher degree of accuracy. The number of magnet segment-sensor combinations is preferably equal to the product of the number of magnetic field sensors and the number of magnetic poles of the secondary part.

It is advantageous if the secondary part is rotated relative to the primary part in such a way that it runs through a number of magnet segment-sensor combinations, if a first uncorrected speed signal is determined using the measuring device for these magnet segment-sensor combinations, if a reference signal for the speed of the EC motor which has a higher degree of accuracy than the uncorrected speed signal is also determined, if the correction values are determined as correction factors using the first uncorrected speed signal and the reference signal, if the magnet segment-sensor combinations of the first uncorrected speed signal are run through again and a second uncorrected speed signal is then detected by the measuring device, and if this speed signal is corrected using the previously determined correction factors. The correction values are thus determined in the form of correction factors, whereby the measurement errors caused by the tolerances of the magnet segment at different speeds are able to be corrected. The reference signal may be a measuring signal which is detected, for example, using an additional position measuring device at the time the EC motor is manufactured. The reference signal may also be a speed signal and/or an integrated acceleration signal of a shaft which is coupled to the EC motor.

In a preferred embodiment of the present invention, the reference signal is formed by smoothing the first uncorrected speed signal by filtering. An additional sensor for measuring the reference signal may thus be omitted.

It is particularly advantageous if the secondary part is rotated relative to the primary part in such a way that the individual magnet segment-sensor combinations occur at least twice, if a correction factor is determined for each magnet segment-sensor combination, if a mean value is determined from the correction factors determined from each magnet segment-sensor combination, and if the thus obtained mean values are saved as new correction factors and the speed signal is corrected using these correction factors when the magnet segment-sensor combinations are run through again. An even higher degree of accuracy may thus be achieved for the speed signal acquisition. The individual magnet segment-sensor combinations are preferably run through as often as possible. This is the case in particular in a continuously rotating EC motor such as in the case of an EC motor for an electronic camshaft adjustment (EVT, i.e., electronic valve timing). Such a continuously rotating EC motor almost always makes it possible to adapt the correction values, so that the correction factors rapidly assume an approximately constant value.

In one embodiment of the present invention, the arithmetic mean is formed as the mean value. All correction factors used for forming the mean value are applied to the mean value with the same weight.

In a preferred embodiment of the present invention, a sliding mean is formed as a mean value, preferably by reducing the weight with which the correction factors are applied to the mean value with increasing age of the correction factors. New correction factors are thus taken into account in the mean value to a greater degree than correction factors associated with an earlier point in time. Once an error occurs resulting in a magnet segment-sensor combination not being recognized and thus the already determined correction factors being assigned to the wrong magnet segments, the wrong correction factor only affects the correction of the speed signal for a short period, i.e., wrong correction factors are relatively rapidly "forgotten."

In one advantageous embodiment of the present invention, the sliding mean values $F_{new}[i(t-T)]$ for the individual magnet segment-sensor combinations are determined cyclically according to the formula $F_{new}[i(t-T)]=\lambda F_{old}[i(t-T)]+(1-\lambda)F[i(t-T)]$, where i is the index identifying the particular magnet segment-sensor combination, t is the time, T is a delay between the actual speed and the measured speed, $F_{old}[i(t-T)]$ is the mean value determined for the latest averaging at index i, and $\lambda$ is a forget factor, which is greater than zero and less than 1, being preferably between 0.7 and 0.9. Such an averaging is suitable in particular for on-line computation. Time T is a function of the rotational speed and decreases as the rotational speed (event-controlled system) decreases.

In an advantageous embodiment of the method,
a) The secondary part is rotated relative to the primary part, and the correction factors for the individual magnet segment-sensor combinations are determined and saved.
b) The corresponding magnet segment-sensor combinations are run through again, a set of new correction factors being determined.
c) The correction factors of the old correction factor set are cyclically replaced by those of the new correction factor set, and the correction factor sets are then compared to one another.
d) Step c) is repeated until all replacement combinations of the old correction factor set have been compared to the new correction factor set.
e) The replacement combination in which maximum agreement with the new correction factor set occurs is determined.
f) The rotational speed signal is corrected using the correction values of the old correction factor set associated with this replacement combination.

In this way, the association of correction factors with magnet segments may be restored if it has unintentionally been modified due to an error in the measuring signal, for example. This makes it possible to continue to use the already determined correction factors, even after the occurrence of the error. An identifier on the secondary part of the EC motor, which makes an absolute measurement of the position of the secondary part relative to the primary part, may thus be omitted. However, the method may be advantageously used even after the EC motor has been switched on again to associate correction factors which were determined during an earlier ON phase of the EC motor and have been saved in a non-volatile memory to those magnet segment-sensor combinations for which they were determined during the earlier ON phase. The correction factors may possibly also be determined under ideal conditions at the time of manufacturing of the EC motor, preferably during a final phase of manufacturing.

Occasionally, a mean value may be formed from the correction factors of the old correction factor set and the new correction factor set associated with one another in the replacement combination in which maximum agreement occurs between the correction factor sets and saved as the new correction factor, the rotational speed being corrected using the correction factor set obtained via this averaging. In this way, the correction factors of both the first data set and the second data set are taken into account.

In an advantageous embodiment of the present invention,
a) The secondary part is rotated relative to the primary part in such a way that all magnet segment-sensor combinations are run through at least once.
b) The position measuring signal is generated by running through a number of measuring signal states for each pair of poles of the secondary part in each revolution of the EC motor.
c) A first data set having a number of value combinations corresponding to the number of magnet segment-sensor combinations, each having at least one correction factor for the corresponding magnet segment-sensor combination and a measuring signal state associated with this magnet segment-sensor combination, is determined and saved.

d) The corresponding magnet segment-sensor combinations are run through again, a new, second data set including value combinations being determined and saved.

e) In the case of a deviation between the measuring signal states of the first data set and those of the second data set, the value combinations of the first data set are cyclically shifted relative to those of the second data set until agreement between the measuring signal states of the data sets is achieved.

f) The correction factors of the data set associated with one another are then compared to one another.

g) The correction factors of the first data set are cyclically replaced in a number of steps corresponding to double the number of magnetic field sensors with the correction factors of the second data set, and the correction factors of the data sets associated with one another are then compared.

h) Step g) is repeated if necessary until all replacement combinations have been processed.

i) A replacement combination in which maximum agreement occurs between the correction factors of the data sets is determined.

j) The rotational speed signal is corrected using the arrangement of correction values of the first data set associated with this replacement combination With the aid of these measures, it is possible to restore the association of correction factors with the magnet segment-sensor combinations using relatively few replacement and/or shifting operations and therefore relatively little time.

It is even possible to form a mean value from the correction factors associated with one another of the first and second data sets in the replacement combination in which maximum agreement occurs between the correction factors of the data sets, to store this mean value as the new correction factor, and to correct the speed signal using the correction factor set obtained from this averaging. The correction factors of both the first and second data sets are thus taken into account in correcting the speed signal.

In an advantageous embodiment of the method, the variation range of the uncorrected speed signal and of the corrected speed signal is determined and compared, the correction factors being determined again and/or the association of the correction factors with the magnet segment-sensor combinations being restored in the case where the variation range of the corrected speed signal is greater than that of the uncorrected speed signal. It is assumed here that, in the case where the variation of the corrected speed signal is greater than that of the uncorrected speed signal, an error has occurred in associating the correction factors with the individual magnet segment-sensor combinations, due to EMC radiation for example. To correct this error, the correction factors may be reset to the value 1 and then re-adapted or the original association is restored, for example, by cyclically replacing the correction factors.

The correction factors are advantageously limited to a predefined range of values, which is preferably between 0.8 and 1.2. This allows outliers in the corrected speed signal, which are caused by implausible correction factors situated outside the predefined value range, to be suppressed.

BRIEF DESCRIPTION OF THE DRAWINGS

Exemplary embodiments of the present invention are explained below with reference to the drawings, in which.

DETAILED DESCRIPTION

Figure 1:
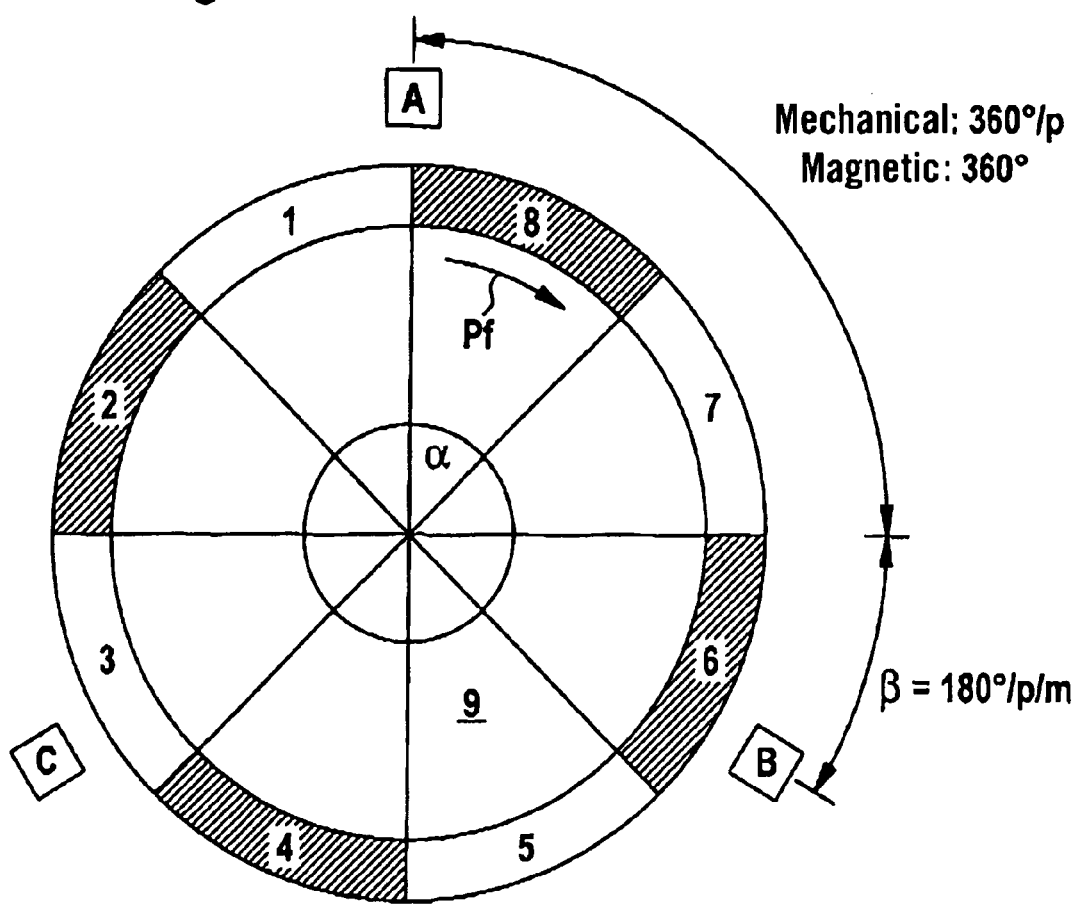
FIG. 1 shows a schematic view of the front of the secondary part of an EC motor, magnetic segments being situated on the periphery of the secondary part, and a position measuring device being provided for detecting the position of the secondary part relative to the primary part.

In the drawing, an EC motor has a primary part designed as a stator and has a winding, and a secondary part which is designed as an approximately cylindrical rotor and has permanently magnetic magnet segments 1 through 8 magnetized in alternatingly opposite directions, offset with respect to one another, and situated on a magnetically highly conductive carrier part 9. In the exemplary embodiment shown in FIG. 1, the secondary part has eight magnet segments 1 through 8, which are offset with respect to one another in a grid of 45° in the circumferential direction of carrier part 9. Each magnet segment 1 through 8 forms a magnetic pole on the periphery of the secondary part, resulting in a total of p pole pairs over the periphery. In FIG. 1 this is illustrated as an example for a secondary part having p=4 pole pairs. On the ring formed by magnet segments 1 through 8, magnetization thus changes direction eight times per revolution. Magnet segments 1 through 8 have tolerances regarding both their positions and their circumferential dimensions. The mechanical angle α between points of adjacent magnet segments 1 through 8 corresponding to one another may thus deviate from the set-point value of 180°/p (here 45°).

The secondary part is mounted rotatably about its longitudinal axis relative to the primary part with the aid of a bearing not illustrated in detail in the drawing. The forward direction of rotation of the secondary part is indicated in FIG. 1 by arrow Pf.

A position measuring device which has a number m of magnetic field sensors A, B, C offset with respect to one another in the circumferential direction, each of which detects the magnetic field of the internally opposite magnetic field segment 1 through 8 is provided for measuring the rotational speed of the secondary part relative to the primary part. In the exemplary embodiment shown in FIG. 1, the number of magnetic field sensors is m=3. Of course, other values are also possible.

The output signal of magnetic field sensor A changes when the secondary part rotates by an angle α. A resolution α of the secondary part rotation angle may thus be achieved using magnetic field sensor A alone. As FIG. 1 shows, sensors A, B, C are situated on the periphery of the secondary part offset with respect to one another. The offset is selected in such a way that the position measuring signal detected by sensors A, B, C has a resolution of 180°/(p·m). This is achieved by the fact that magnetic field sensor B is offset by a mechanical angle of 180°/(m·p) plus an integer multiple of β=180°/m with respect to magnetic field sensor A, and magnetic field sensor C is offset by the double of this mechanical angle with respect to magnetic field sensor A in the forward direction of rotation Pf.

Figure 2:
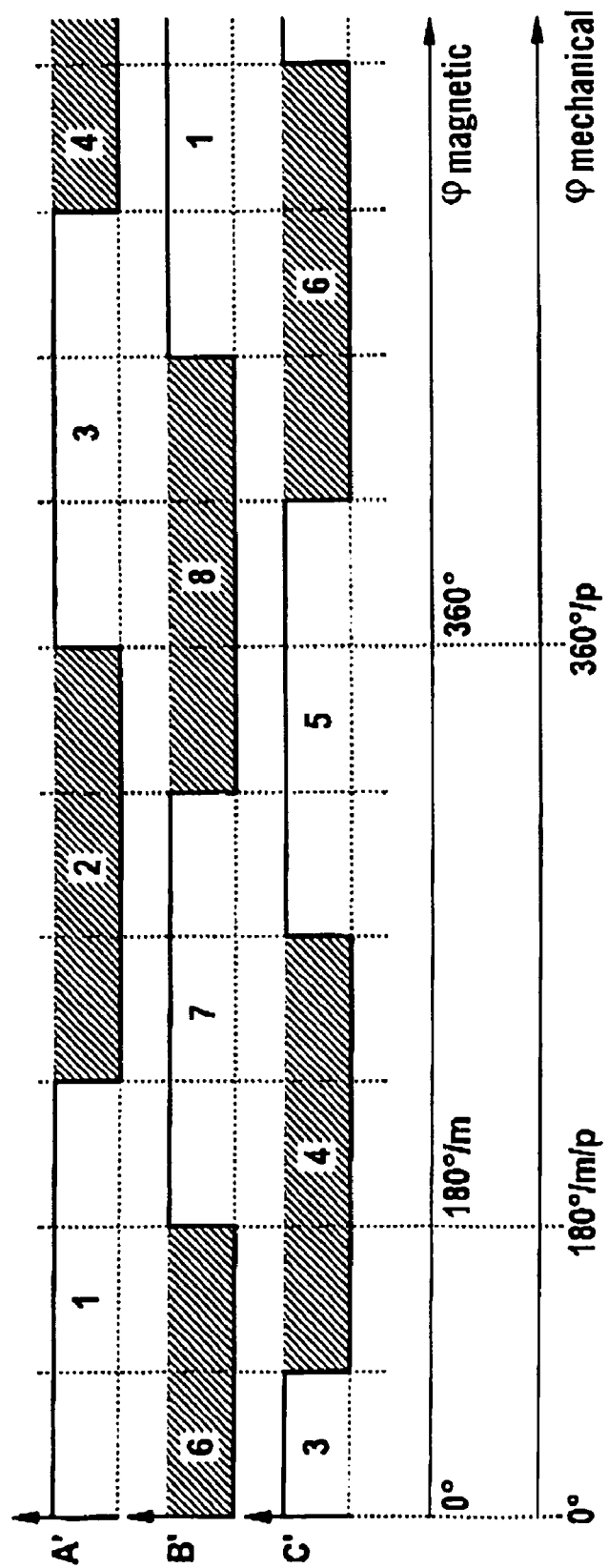
FIG. 2 graphically shows a position measuring signal recorded by the position measuring device.

FIG. 2 graphically shows a section of position measuring signal, composed of output signals A', B', C' of sensors A, B, C, for a clockwise rotation in the direction of arrow Pf. Output signal A' is associated with magnetic field sensor A, output signal B' with magnetic field sensor B, etc. Output signals A', B', C' are digital signals which may assume the logical values 1 or 0. A value 1 occurs when a magnet segment 1 through 8 forming a north pole lies opposite corresponding sensor A, B, C. In a similar way, output signal A', B', C' assumes the logical value 0 when a magnet segment 1 through 8 forming a south pole lies opposite corresponding sensor A, B, C.

To illustrate the association of the individual values of an output signal with magnetic field segment 1 through 8 moving past respective sensor A, B, C, the reference number of respective magnetic field segment 1 through 8 is reproduced on each of the output signal values. In FIG. 2, magnetic rotation angle $\phi_{magnetic}$ and mechanical rotation angle $\phi_{mechanical}$ are plotted on the abscissa below the output signals. It is evident that for a mechanical rotation of 360°/p (=90°), the position measuring signal assumes 2·m (=6) different consecutive states which are then repeated.

The position measuring signal composed of output signals A', B', and C' is transmitted for analysis to an analyzer device, not shown in detail in the drawing, which is connected to magnetic field sensors A, B, C. The analyzing device is only aware of output signals A', B', and C', but not of which magnet segments 1 through 8 are moving past sensors A, B, C.

FIG. 2 shows that one of the magnet segment-sensor combinations is always active at any given time. In FIG. 2 these are the magnet segment-sensor combinations (from left to right) (1, 6, 3), (1, 6, 4), (1, 7, 4), (2, 7, 4), (2, 7, 5), (2, 8, 5), etc. This sequence of magnet segment-sensor combinations is repeated after 2·p magnet segments 1 through 8 have passed a magnetic field sensor A, B, C, i.e., after a full mechanical rotation.

The total rotation angle of the secondary part is determined by counting the switchover events at which the position measuring signal changes its value. When the secondary part rotates clockwise, the total angle is incremented from a starting value at each switchover event. If the secondary part rotates counterclockwise, the magnet segment-sensor combinations switch over in the opposite sequence. This is recognized by the analyzer device, so that it then decrements the total angle at each switchover event.

The thus determined position measuring signal is differentiated to form a speed signal. This may accomplished, for example, by measuring time $\Delta t$ between two changes in the position measuring signal and speed $\omega$ is determined as follows:

$$\omega = \pi/(m \cdot p \cdot \Delta t) [rad/s]$$

Due to the tolerances of magnet segments 1 through 8, thus determined speed signal $\omega_{meas}$ subject to errors, which result, for example, at constant actual speed of the secondary part, in abrupt changes in the speed signal.

In the analyzer device, magnet segment-sensor combinations are numbered 1 through 2·m·p, so that in the case of clockwise rotation the numerical value, which is referred to hereinafter as "index i" for short, goes high and, when 2·m·p is reached, jumps to 1. When the EC motor is switched on, index i is set to a start value, e.g., to 1.

A correction factor $F_{adap}[i]$, which is assigned to corresponding magnet segment 1 through 8 via index i, is now determined for each magnet segment-sensor combination. This correction factor $F_{adap}[i]$ corresponds to the ratio between speed value $\omega_{meas,i}$, which was determined with the aid of the position measuring signal for the ith magnet segment-sensor combination, and a reference speed value $\omega_{ref}$, which is assumed to have a higher degree of accuracy than speed value $\omega_{meas,i}$. Correction factors $F_{adap}[i]$ are saved in a data memory of the analyzer device.

For each speed value $\omega_{meas,i}$, a corrected speed value $\omega_{corr,i}$ is determined with the aid of correction factor $F_{adap}[i]$ as follows $$\omega_{corr,i} = \omega_{meas,i}/F_{adap}[i].$$

Correction factors $F_{adap}[i]$ are determined in a learning process. At the start of the learning process, all correction factors $F_{adap}[i]$ are set to 1, i.e., corrected speed $\omega_{corr,i}$ initially corresponds to measured speed $\omega_{meas,i}$. During the learning process, correction factors $F_{adap}[i]$ are limited to a range of values between 0.8 and 1.2, to limit the magnitude of the error in the event of any erroneous adaptation, which cannot be completely ruled out in practice.

Figure 3:
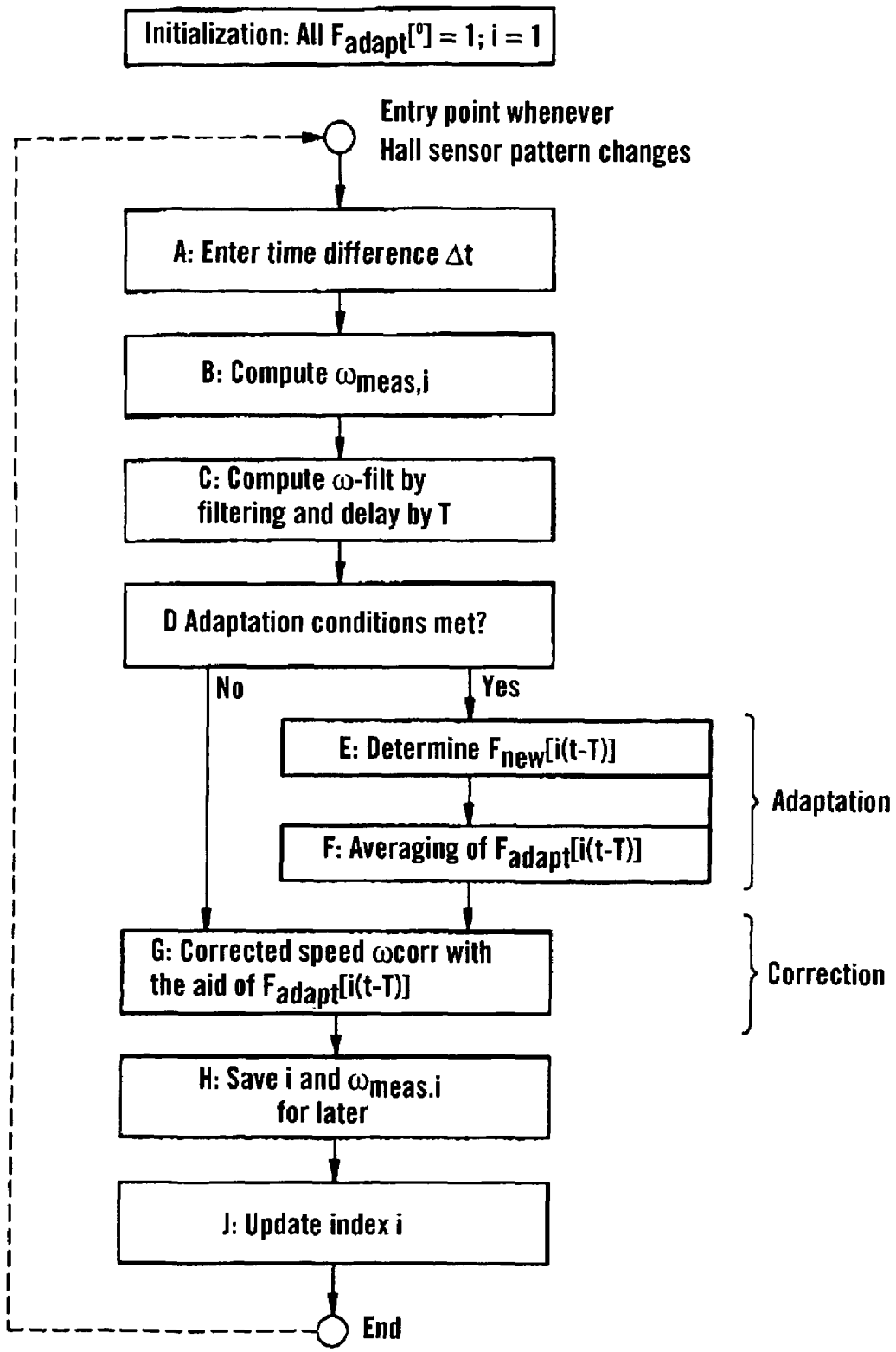
FIG. 3 shows a flow chart illustrating the individual steps in correcting a speed signal generated from the position measuring signal.

As FIG. 3 shows, the following sequence is run through whenever a change in the position measuring signal is recognized. The present point in time is labeled with t.

A: Time differential $\Delta t$ between the last and the instantaneous change in the position measuring signal is saved. It shows the scanning time of the previously active magnet segment-sensor combination. Index i points at the measured value of the position measuring signal associated with this magnet segment-sensor combination, which is adapted at the end of the sequence for calling the next sequence.

B: Computing the uncorrected speed $\omega_{meas,i} = \pi/(m \cdot p \cdot \Delta t)$.

C: Filtering the uncorrected speed: Since true speed $\omega_{true}$ is unknown, the reference signal for the speed is formed by filtering the uncorrected speed. Result $\omega_{ref}$ of the filtering agrees relatively well with the actual speed T seconds ago, $\omega_{ref}(t) \approx \omega_{true}(t-T)$. T is the delay of the filter, which varies according to the type and class of the filter.

D: Checking the adaptation conditions. For example, the correction factor is not adapted if the direction of rotation of the secondary part has changed. Also during a phase of strong acceleration or deceleration of the secondary part, adaptation of the correction factor is suspended, since the filtered speed will then probably not accurately agree with the actual speed.

E: The actual correction factor for the last magnet segment-sensor combination is obtained as the quotient of computed speed $\omega_{meas,i}(t)$ and actual speed signal $\omega_{true}(t)$, $$F_{true}[i] = \omega_{meas,i}(t)/\omega_{true}(t).$$

Since true speed $\omega_{true}$ is only available with a delay T in the form of reference speed $\omega_{ref}$, all other intervening quantities must also be delayed. Therefore, index i and uncorrected speed values $\omega_{meas,i}$ are saved in a shift register to make their delay values now available. This result in the following correction factor:

$$F[i(t-T)] = \omega_{meas}(t-T)/\omega_{ref}(t).$$

F: Averaging for the correction factor: Correction factor F still has a certain inaccuracy, because speed reference value $\omega_{ref}$ is only approximately equal to actual speed value $\omega_{true}$. Therefore, new correction factors are determined for each of the individual revolutions of the secondary part, and these correction factors determined gradually for the particular magnet segment-sensor combination are averaged by forming a sliding mean value:

$$F_{new}[i(t-T)] = \lambda F_{old}[i(t-T)](1-\lambda)F[i(t-T)],$$

where $F_{new}$ is the instantaneous correction factor mean value, $F_{old}$ is the mean value determined in the previous cycle, and λ is a forget factor, which may be between 0 and 1. The greater λ, the longer past values $\omega_{meas,i}(t)$ are taken into account.

G: The correction is performed using updated values i(t) and $\omega_{meas,i}(t)$. The measured value is corrected using correction factor F[i] adapted to that point:

$\omega_{corr,i} = \omega_{meas}(t) / F[i]$.

The speed signal is corrected with the aid of the just scanned magnet segment-sensor combination, while older values are used for the adaptation of correction factors F[i].

H: Saving i and $\omega_{meas,i}$ in the shift register enabling subsequently re-access to these values as past values.

I: To prepare the next sequence, the direction of rotation of the secondary part is detected using the magnet segment-sensor combination and index i is increased (clockwise rotation) or decreased (counterclockwise rotation). If index i is below or over the interval [1-2·p·m], it is set at 2·p·m (below) or 1 (over). Index i now labels the instantaneous magnet segment-sensor combination.

One decisive point in the adaptation is the accuracy with which the actual speed is approximated. In the above-described exemplary embodiment, this approximation is achieved by filtering the measured speed. It is, however, also possible to filter the already corrected speeds. If another measuring signal is available form which the actual speed may be deduced it may also be used.

When the device composed of the EC motor and the analyzer device is switched off, the 2·p·m learned correction factors are written into a non-volatile data memory of the analyzer device. Because at the beginning of the adaptation index i for a magnet segment-sensor combination which just happened to be active was set to an arbitrarily selected start value, and this magnet segment-sensor combination is initially unknown when the device is switched on again, the assignment of the correction factors to the magnet segment-sensor combinations must be verified and, if an error is found, it must be corrected, so that the correction factors may continue to be used after the device is switched on again.

The same problem exists even during adaptation if it is performed incorrectly, for example, due to signal interference, or is not performed, so that index i continues to be written incorrectly, and thus the correction factors are assigned to magnet segment-sensor combinations which are shifted with respect to the magnet segment-sensor combinations for which correction factors have been determined. In such a case, corrected speed $\omega_{corr}$ may differ from the actual speed by considerably more than the uncorrected speed.

The correct sequence of the 2 m (=6) consecutive position measuring signal states is saved in the data memory. It is compared to the sequence of the position measuring signal states. If a difference is found, this error is eliminated when the sequence is called next. The change in the magnet segment-sensor combinations is unique within ±m changes. If there is certainty that the direction of rotation of the secondary part was preserved during the error event, even (2m−1) written values may be corrected.

The quality of the adaptation is monitored by comparing the range of variation of the corrected speed with that of the uncorrected speed always over a certain time window. A fluctuation of the corrected speed greater than that of the uncorrected speed indicates erroneous association. The association is then either restored or the correction factors are set to 1.

In restoring the association, it is assumed that the numerical sequence of the 2·p·m correction factors represents a type of characteristic signature. If a new set of correction factors is adapted, these must have a very similar numerical sequence; however, the new sequence may be shifted with respect to the previous sequence. To restore the association, the old numerical sequence is therefore cyclically shifted 2·p·m times and compared to the previous sequence after each shift step. For the replacement or shift combination in which the best agreement occurs between the old sequence and the previous sequence, it is assumed that the numerical values of the old sequence are correctly associated with the magnet segment-sensor combination. The correction of the speed signal and/or further adaptation is/are then performed using this association.

In another exemplary embodiment of the present invention, the following procedure is used:

First, a first data set having a number of value combinations equal to the number of magnet segment-sensor combinations, each having at least one correction factor for the corresponding magnet segment-sensor combination and a measured signal state associated with it, is determined and saved. One exemplary embodiment of such a data set for an EC motor having three magnetic field sensors and three pairs of poles is graphically shown in the upper half of FIG. 4.

Subsequently, the magnet segment-sensor combinations for which the correction factors have been determined are run through again, a new, second, data set including value combinations being determined and saved. This second data set is graphically shown in the lower half of FIG. 4.

Subsequently, the measuring signal states of the first and second data sets are compared. If a difference is found, the value combinations of the data sets are cyclically shifted with respect to one another until the measuring signal states of the data sets agree. In the exemplary embodiment of FIG. 4, this may be achieved by cyclically shifting the value combinations of the old adaptation by three positions to the right.

Figure 4:
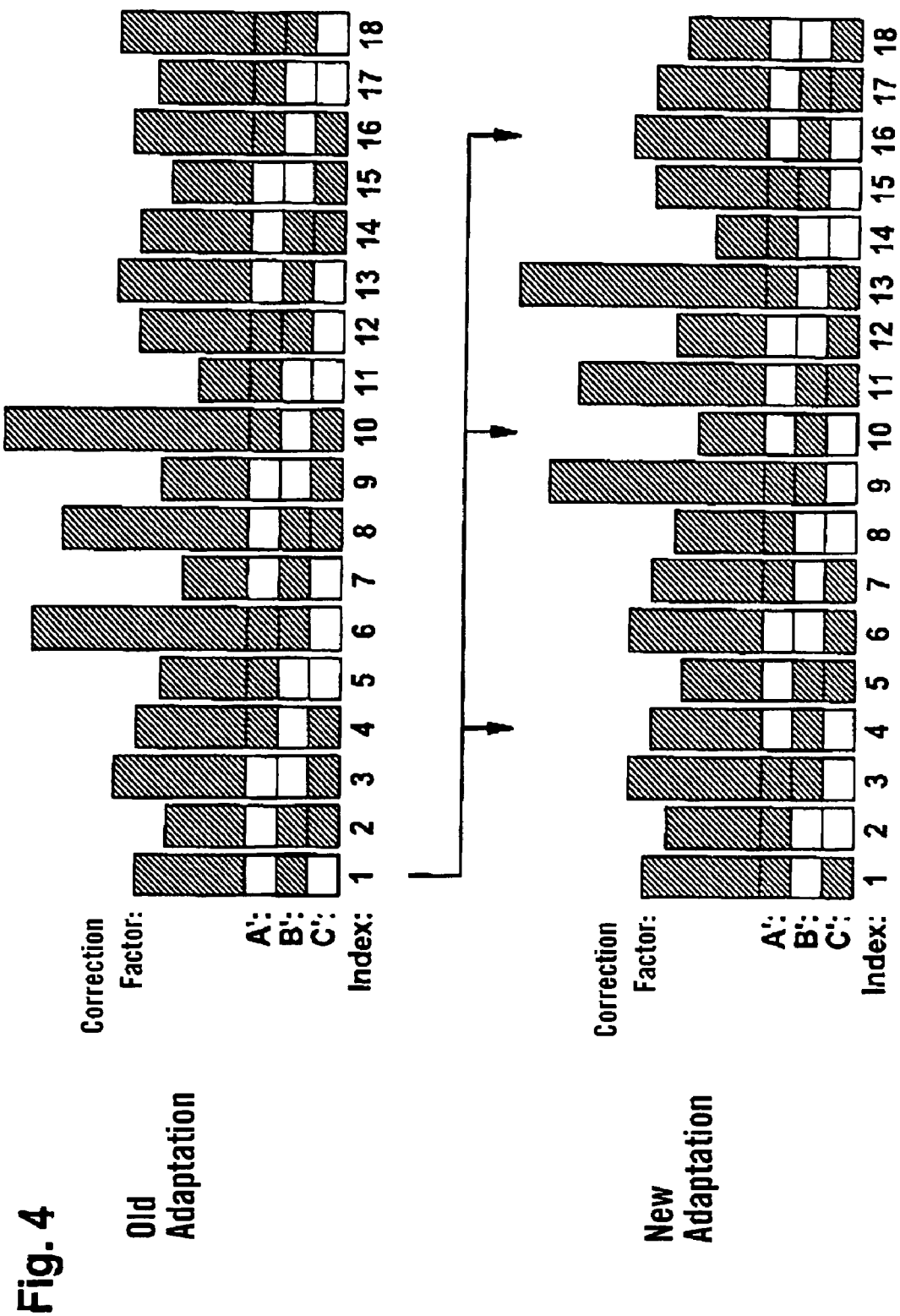
FIG. 4 graphically shows correction factors, the magnitudes of the correction factors being illustrated as a bar chart, a value of a position measuring signal associated with the correction factor in question being shown below the bar and, an index associating the correction factor in question with a magnet segment-sensor combination being shown below the correction factor.

The correction factors of the data sets associated with one another are then compared, i.e., the correction factor of the first data set in FIG. 4 having index i=1 is compared to the correction factor having index i=4 of the second data set; the correction factor of the first data set having index i=2 is compared to the correction factor of the second data set having index i=5, etc.

In a further step, the correction factors of the first data set are cyclically replaced with the correction factors of the other data set in a number of steps corresponding to the double the number of magnetic field sensors (i.e., 2·p=6 steps), and then the correction factors of the data sets associated with one another are compared. This step is repeated until all replacement combinations have been processed.

The replacement combination in which a maximum agreement between the correction factor sets is achieved is determined. Using this replacement combination the correction factors of the correction factor sets associated with one another are averaged and the mean value is saved as the new correction factor. The speed measuring signal is then corrected using the new correction factors thus determined.

It is therefore not necessary to shift 2·p·m times. It must only be determined which of the p magnetic periods fits best. During the time where the new correction factors are adapted, the corrected speed is computed using either the factor 1 or the newly adapted correction factors.

What is claimed is:

1. A method for measuring the rotational speed of an EC motor, the EC motor having a primary part including a winding and a secondary part having a plurality of magnet segments offset with respect to one another in a circumferential direction and magnetized in alternatingly opposite directions, each of the plurality of magnet segments having a tolerance with regard to at least one of a positioning and a dimension of the respective magnet segment, the method comprising:
   rotating the secondary part relative to the primary part;
   detecting a position of the magnet segments relative to the primary part so as to create a position measuring signal;
   differentiating the position measuring signal so as to form a rotational speed signal;
   determining and saving at least one correction value to compensate an influence of at least one of the tolerances on the speed signal; and
   correcting the speed signal using the correction value.

2. The method as recited in claim 1, wherein the detecting is performed using a measuring device including a plurality of magnetic field sensors disposed on the primary part offset relative to one another in the circumferential direction, wherein the detecting includes determining a plurality of respective magnet segment-sensor combinations for each revolution of the secondary part relative to the primary part, wherein the determining of the correction value includes determining and saving a correction value for each of the respective magnet segment-sensor combinations, and wherein the correcting is performed for each magnet segment-sensor combination.

3. The method as recited in claim 2, wherein rotating is performed so as to obtain a plurality of magnet segment-sensor combinations; a first uncorrected speed signal is detected for these magnet segment-sensor combinations using the measuring device; a reference signal for the rotational speed of the EC motor having a higher degree of accuracy than the first uncorrected speed signal determined; the correction values are determined as correction factors using the first uncorrected speed signal and the reference signal; the magnet segment-sensor combinations of the first uncorrected speed signal are run through again; a second uncorrected speed signal is determined using the measuring device; and the second speed signal is corrected with the aid of the previously determined correction factors.

4. The method as recited in claim 3, wherein the reference signal is determined by smoothing the first uncorrected speed signal via filtering.

5. The method as recited in claim 3, wherein the rotating is performed so that each of the individual magnet segment-sensor combinations occur at least twice; a correction factor is determined for each of the individual magnet segment-sensor combinations; the correction factors determined for the individual magnet segment-sensor combinations are each averaged to obtain a plurality of mean values; the plurality of mean values are saved as new correction factors, and the speed signal is corrected with the aid of new correction factors when the magnet segment-sensor combinations are run through again.

6. The method as recited in claim 5, wherein the averaging to obtain mean values includes obtaining arithmetic mean values.

7. The method as recited in claim 5, wherein the averaging to obtain mean values includes obtaining sliding averages.

8. The method as recited in claim 7, wherein the sliding averages are obtained using a weight for weighting the correction factors in forming the mean value decreases as the age of the correction factors increases.

9. The method as recited in claim 1, wherein the sliding means $F_{new}[i(t-T)]$ for the individual magnet segment-sensor combinations are cyclically determined according to the formula $F_{new}[i(t-T)]=\lambda F_{old}[i(t-T)]+(1-\lambda)F[i(t-T)]$, where i is an index identifying the particular magnet segment-sensor combination, t is the time, T is a delay between the actual speed and the measured speed, $F_{old}[i(t-T)]$ is the mean value determined in the latest averaging at index i, and $\lambda$ is a forget factor which is greater than zero and less than 1 and is preferably in the interval between 0.7 and 0.9.

10. The method as recited in claim 1, wherein
   a) the secondary part is rotated with respect to the primary part and the correction factors for individual magnet segment-sensor combinations are determined and saved;
   b) the corresponding magnet segment-sensor combinations are then run through again, a set of new correction factors being determined;
   c) the correction factors of the old correction factor set are cyclically replaced with those of the new correction factor set, and the correction factor sets are then compared;
   d) step c) is repeated until all replacement combinations of the old correction factor set; have been compared to the new correction factor set;
   e) the replacement combination for which maximum agreement with the new correction factor set occurs is determined; and
   f) the arrangement of correction values of the old correction factor set associated with this replacement combination is used to correct the speed signal.

11. The method as recited in claim 10, wherein a mean value is formed from the correction factors of the old correction factor set and the new correction factor set associated with one another in the replacement combination where maximum agreement occurs between the correction factor sets, and this mean value is saved as the new correction factor, and the speed signal is corrected using this correction factor set obtained by averaging.

12. The method as recited in claim 1, wherein
   a) the secondary part is rotated with respect to the primary part in such a way that all magnet segment-sensor combinations are run through at least once;
   b) the position measuring signal is generated in such a way that a number of measuring signal states are run through for each pair of poles of the secondary part for each revolution of the EC motor;
   c) a first data set having a number of value combinations equal to the number of magnet segment-sensor combinations, each having at least one correction factor for the corresponding magnet segment-sensor combination and a measuring signal state associated therewith, is determined and saved;
   d) the corresponding magnet segment-sensor combinations are then run through again, a new, second data set having value combinations being determined and saved;
   e) in the event of a deviation between the measuring signal states of the first and those of the second data set, the value combinations of the first data set are cyclically shifted with respect to those of the second data set in such a way that the measuring signal states of the data sets are the same;
   f) the correction factors of the data sets associated with one another are then compared;
   g) the correction factors of the first data set are cyclically replaced by the correction factors of the second data set in a number of steps corresponding to double the number of magnetic field sensors, and the correction factors of the data sets associated with one another are then compared;

h) step g) is repeated if necessary until all replacement combinations have been processed;

i) a replacement combination in which maximum agreement occurs between the correction factors of the data sets is determined;

j) the speed signal is corrected using this arrangement of the correction values of the first data set associated with this replacement combination.

13. The method as recited in claim 12, wherein a mean value is formed from the correction factors of the first and second data sets associated with one another in the replacement combination in which maximum agreement occurs between the correction factors of the data sets, and this mean value is saved as the new correction factor, and the speed signal is corrected using this correction factor set formed by averaging.

14. The method as recited in claim 1, further comprising determining a ranges of variation of the uncorrected speed signal and the corrected speed signal in a time window and compared, and if the range of variation of the corrected speed signal is greater than that of the uncorrected speed signal, the correction factors are determined again and/or the association of the correction factors with the magnet segment-sensor combinations is restored.

15. The method as recited in claim 1, wherein the correction factors are limited to a predefined range of values.

16. The method as recited in claim 15, wherein the predefined range of values is between 0.8 and 1.2.

* * * * *